(12) United States Patent
Cho

(10) Patent No.: US 6,723,197 B2
(45) Date of Patent: Apr. 20, 2004

(54) LIQUID PRESSURE TRANSFER PRINTING METHOD FOR STEERING WHEEL RIM OF AUTOMOBILE

(76) Inventor: Youn-Soo Cho, 504-201 Hyojachon, 301 Seohyun-dong, Bundang-gu, Sungnam-city, 463-050 Kyungki-do (KR)

(*) Notice: Subject to any disclaimer, the term of this patent is extended or adjusted under 35 U.S.C. 154(b) by 0 days.

(21) Appl. No.: 10/221,272

(22) PCT Filed: Mar. 26, 2001

(86) PCT No.: PCT/KR01/00483
§ 371 (c)(1),
(2), (4) Date: Sep. 10, 2002

(87) PCT Pub. No.: WO01/72570
PCT Pub. Date: Oct. 4, 2001

(65) Prior Publication Data
US 2003/0037686 A1 Feb. 27, 2003

(30) Foreign Application Priority Data
Mar. 25, 2000 (KR) ............................ 2000/5289

(51) Int. Cl.⁷ ................ B44C 1/175; B32B 3/20; B05D 5/06; B05D 1/20; B05C 3/00

(52) U.S. Cl. ............ 156/230; 156/235; 156/236; 156/240; 156/277; 427/147; 427/149; 427/267; 427/434.5; 118/402

(58) Field of Search ............... 156/230, 236, 156/240, 241, 247, 277, 284, 285, 235; 427/146, 147, 141, 434.4, 434.2, 256, 258, 267, 264, 271, 272, 149; 118/402, 403, 436.1; 269/55, 56, 77

(56) References Cited
U.S. PATENT DOCUMENTS 6,022,438 A   2/2000  Watanabe et al.
6,065,366 A   5/2000  Koyama et al.
6,214,154 B1  4/2001  Cho

FOREIGN PATENT DOCUMENTS

| EP | 957021 | * 11/1999 | ............ B62D/1/04 |
| JP | 60-143961 | 7/1985 | |
| JP | 61-130081 | 6/1986 | |
| JP | 9-1996 | 1/1997 | |

\* cited by examiner

Primary Examiner—J. A. Lorengo
(74) Attorney, Agent, or Firm—Leydig, Voit & Mayer, Ltd.

(57) ABSTRACT

A liquid pressure transfer printing on a steering wheel rim of an automobile, using a transfer printing sheet having different patterns or brightness at left and right sides, is achieved by preparing a transfer printing sheet for a front surface where patterns having a predetermined shape are arranged at all positions corresponding to transfer printing positions on the front surface of the steering wheel rim, using computer graphics, so that the patterns can be concurrently transfer-printed at transfer printing positions, preparing transfer printing sheets for part of a rear surface where patterns of a predetermined shape are independently arranged to correspond to positions of the patterns of a predetermined shape of the transfer printing sheet for the front surface, using computer graphics, so that transfer printing can be performed without interference on the rear surface of the steering wheel rim where a steering column attachment portion protrudes, performing transfer printing on all transfer printing portions of the front surface of the steering wheel rim using the transfer printing sheet for the front surface while masking the rear surface of the steering wheel rim, cleaning and masking the front surface on which the first transfer printing has been performed, and, after flipping the steering wheel rim, performing transfer printing on transfer printing portions of the rear surface using the transfer printing sheet for part of the rear surface.

4 Claims, 6 Drawing Sheets

FIG. 4(PRIOR ART)
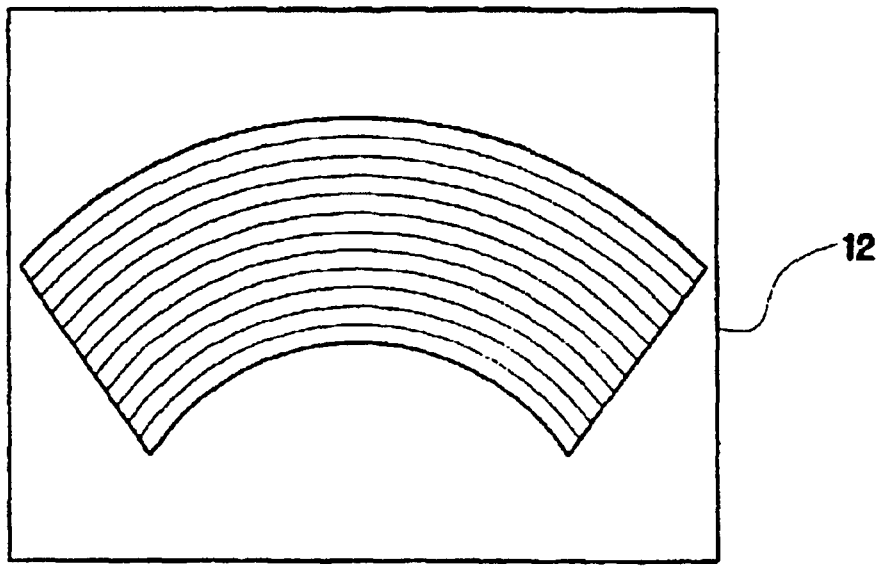
FIG. 5
FIG. 5(PRIOR ART)
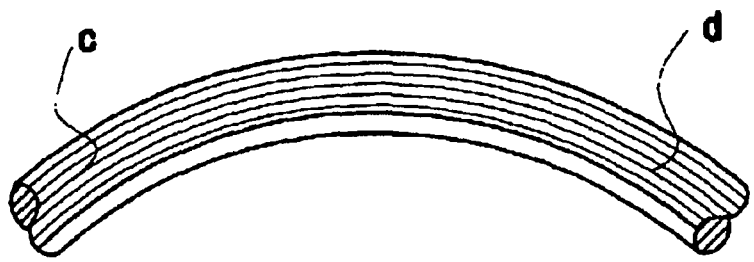

LIQUID PRESSURE TRANSFER PRINTING METHOD FOR STEERING WHEEL RIM OF AUTOMOBILE

BACKGROUND OF THE INVENTION

1. Field of the Invention

The present invention relates to a method of performing transfer printing of a pattern to the core of a steering wheel rim for an automobile using a transfer printing sheet, and more particularly, to a liquid pressure transfer printing method for a steering wheel rim of an automobile by which the number of steps can be reduced so that the required cost and time are reduced, a boundary created by performing transfer printing in more than one step is not noticeable, and the transfer-printed pattern can be smoothly connected when using a transfer printing sheet where the shapes of left and right patterns are greatly different or a difference in brightness is significant.

2. Description of the Related Art

Conventional techniques of transfer printing to a steering wheel rim by using a transfer printing sheet are disclosed in Korean Patent Application Nos. 98-17424, 98-17425, 98-36990, 98-36991 and 99-3368 filed by the present applicant.

Korean Patent Application No. 98-17424 suggests a technique to solve problems such as extension and deformation of a printing pattern due to mismatch of a printing state by a conventional liquid pressure transfer printing method in which a film for transfer printing floats on water and an object is pressed from above. According to this technique, transfer printing can be selectively performed to a partial or entire surface by using a mask member such as masking tape or a rubber jig. Thus, a plurality of patterns or shapes can be transfer-printed to an object such as a ball or a circular frame to which it is difficult to transfer-print a pattern, while maintaining a high degree of match.

Also, Korean Patent Application Nos. 98-17425, 98-36990, and 98-36991 disclose various liquid pressure transfer printing methods applied to a steering wheel rim of an automobile so that mass production is possible.

Also, Korean Patent Application No. 99-3368 discloses a technique for overcoming difficulty in a process requiring accuracy with respect to a combination boundary portion of a mask member in employing the above techniques so that faster and more accurate match of a pattern is possible. According to this technique, difficulties in maintaining the angle of an expected end portion of a masking tape to be 60° and performing a masking step after consecutive transfer printing while a distance of 0.1–0.2 mm is accurately maintained between the masking tape and the central line, can be solved.

FIGS. 1 through 5 show a steering wheel rim for an automobile and a liquid pressure transfer printing method for printing a pattern thereon according to the above-mentioned conventional techniques.

Referring to FIG. 1, in a steering wheel rim, arc-shaped portions a and b, not including a portion 1 which is covered with leather, are coated by a liquid pressure transfer printing method. That is, the liquid pressure transfer printing method is performed on the portions a and b.

FIG. 3 shows the result of liquid pressure transfer printing applied to the portion a using a transfer printing sheet 2 having the same directivity at the left and right sides thereof as shown in FIG. 2. Since FIG. 3 is only for the purpose of explanation, the size and shape of the transfer printing sheet are not drawn to correspond to the curvature of the portion a. Since drawings showing transfer printing sheets which will be described later are also for the purpose of explanation, the state of curvature in these drawings also does not match the actual state of the portion a as shown FIG. 1.

Next, by rotating the steering wheel rim by 180°, liquid pressure transfer printing is performed on the remaining portion b.

FIG. 5 shows an example of transfer printing using a transfer printing sheet 12 as shown in FIG. 4 which is designed such that a pattern having directivity can be transfer-printed smoothly. Thus, various, aesthetic and natural patterns can be presented by this method.

However, in a process based on the above methods invented by the present applicant, when a transfer printing sheet having a pattern to be presented is asymmetric and has directivity, that is, when a pattern or brightness is different at portions c and d as shown in FIGS. 3 and 5 is to be transfer-printed, there is a need to smoothly connect the pattern presented by the transfer printing sheet according to the difference in brightness of the pattern of the transfer printing sheet at the left and right sides and to improve natural pattern presentation so that the difference in brightness hardly occurs at the boundary portion, during the second transfer printing after the first transfer printing is completed.

Also, as shown in FIG. 5, since different patterns or different brightnesses are formed between the upper and lower surfaces of the steering wheel rim after transfer printing is performed, so that mismatch or an extreme difference in brightness occurs between the patterns, the state of transfer printing is awkward and not natural. To overcome this above problem, the present applicant has suggested an improved liquid pressure transfer printing method in Korean Patent Application No. 99-11606.

FIGS. 6A and 6B show a pair of complementary transfer printing sheets 22 and 22a which are symmetrical with each other. FIG. 7 shows the state in which liquid pressure transfer printing is performed to both sides of the core of a steering wheel rim using the transfer printing sheets 22 and 22a. The complementary transfer printing sheets 22 and 22a are respectively transfer-printed to each of the surfaces of the steering wheel rim by rotating the rim by 180° between transfer printing steps. As a result, smooth transfer printing is performed so that a connection portion is not noticeable, as shown in FIG. 7.

However, when transfer printing is performed only to a particular portion of a steering wheel rim having a steering column attachment portion protruding at one side as shown in FIG. 1, while transfer printing is easily performed on the side where no protruding portion is present, transfer printing to the rear surface having the protrusion is difficult and transfer printing is poorly performed since the transfer printing sheet is obstructed by the protrusion. Thus, due to the structural difficulty, it is necessary to perform multi-step transfer printing for the rear surface of the steering wheel tint so that the protruding steering column attachment does not obstruct the transfer printing sheet.

SUMMARY OF THE INVENTION

To solve the above problems, it is an object of the present invention to provide a liquid pressure transfer printing method for a steering wheel rim of an automobile which can prevent poor transfer printing resulting such as a difference in brightness or improper matching of patterns on the front and rear surfaces of a steering wheel rim so that a natural and aesthetic pattern or smooth brightness can be presented and an accurate and luxurious steering wheel rim can be manufactured.

Also, it is another object of the present invention to provide a liquid pressure transfer printing method for a steering wheel rim of an automobile which can minimize the number of repeated transfer printing steps required when a portion of a steering wheel rim to be printed on has an irregular shape so that the cost and time for work can be saved while improving productivity.

Accordingly, to achieve the above objects, there is provided a liquid pressure transfer printing method for a steering wheel rim of an automobile, using a transfer printing sheet having different patterns or brightness at the left and right sides thereof, the method comprising the steps of preparing a transfer printing sheet for a front surface where patterns having a predetermined shape are arranged at all positions corresponding to transfer printing positions on the front surface of the core of the steering wheel rim by using computer graphics so that the patterns can be concurrently transfer-printed at the transfer printing positions, preparing transfer printing sheets for part of a rear surface where patterns of a predetermined shape are independently arranged to correspond to positions of the patterns of a predetermined shape of the transfer printing sheet for the front surface by using computer graphics so that transfer printing can be performed without interference on the rear surface of the core of the steering wheel rim where a steering column attachment portion protrudes, performing transfer printing on all transfer printing portions of the front surface of the core of the steering wheel rim by using the transfer printing sheet for the front surface while masking the rear surface of the core of the steering wheel rim, cleaning and masking the front surface on which the first transfer printing has been performed, after flipping the steering wheel rim, partially performing transfer printing on transfer printing portions of the rear surface by using the transfer printing sheet for part of the rear surface.

It is preferred in the present invention that the transfer printing sheet for the front surface has a pattern of an arc shape, all positions of which correspond to positions of the core of the steering wheel rim to which transfer printing is to be performed.

It is preferred in the present invention that the pattern formed on the transfer printing sheet for the front surface is complimentary about a center point.

BRIEF DESCRIPTION OF THE DRAWINGS

The above object and advantages of the present invention will become more apparent by describing in detail preferred embodiments thereof with reference to the attached drawings in which:

FIG. 4 is a view showing another typical transfer printing sheet;

FIG. 5 is a partially cut-away perspective view of a core of a steering wheel rim where liquid pressure transfer printing is performed using the transfer printing sheet of FIG. 4;

FIGS. 8A and 8B are views showing a pair of transfer printing sheets sequentially applied to a steering wheel rim for an automobile by the liquid pressure transfer printing method according to the present invention, in which FIG. 8A shows a transfer printing sheet for first front surface transfer printing which is designed such that transfer printing can be performed at once on all portions of the front surface of the steering wheel rim, and FIG. 8B shows a transfer printing sheet for second and third rear surface transfer printing which is designed such that transfer printing can be performed on part of the rear surface of the steering wheel rim where the steering column attachment portion protrudes.

DETAILED DESCRIPTION OF THE INVENTION

Figure 1:
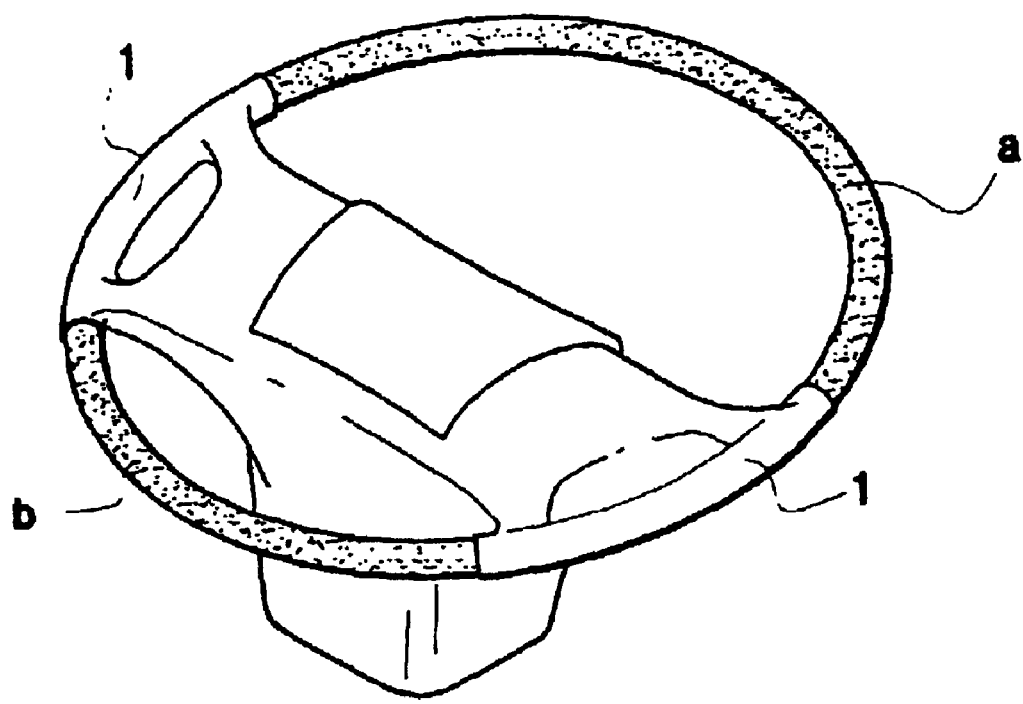
FIG. 1 is a perspective view of a typical steering wheel rim.
Figure 2:
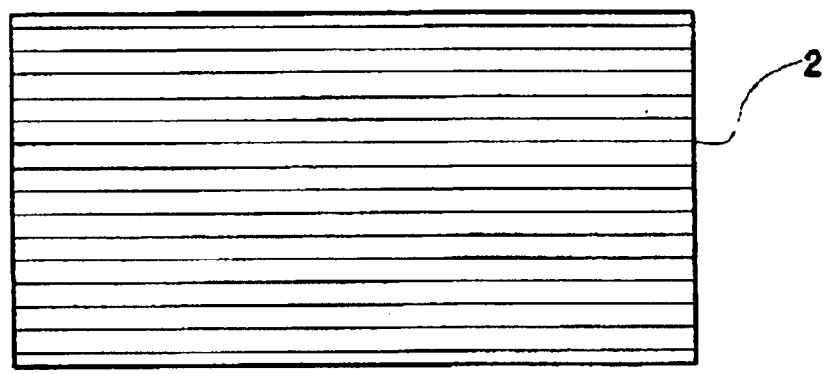
FIG. 2 is a view showing a typical transfer printing sheet used to perform transfer printing on the portions a and b of FIG. 1.
Figure 3:
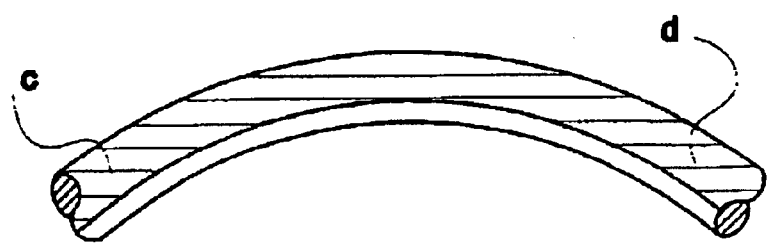
FIG. 3 is a partially cut-away perspective view of a core of a steering wheel rim where liquid pressure transfer printing is performed using the transfer printing sheet of FIG. 2.
Figure 6A:
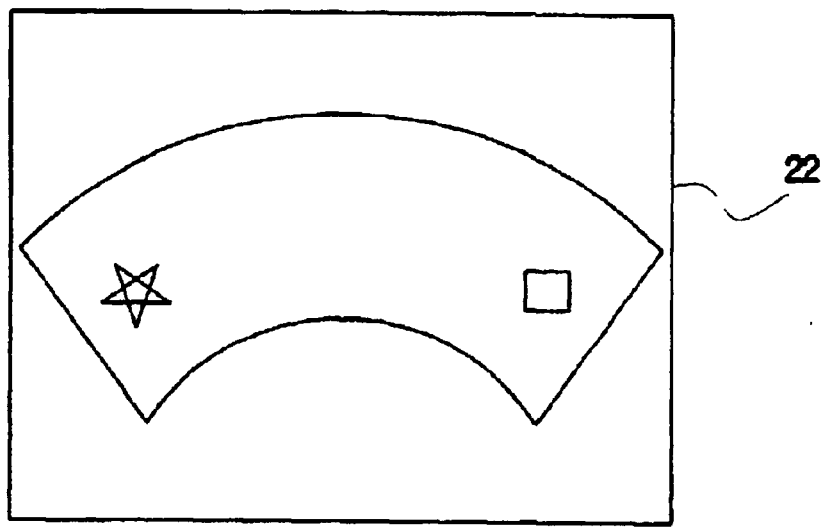
FIGS. 6A and 6B are views showing a pair of complementary transfer printing sheets suggested by the present applicant.
Figure 6B:
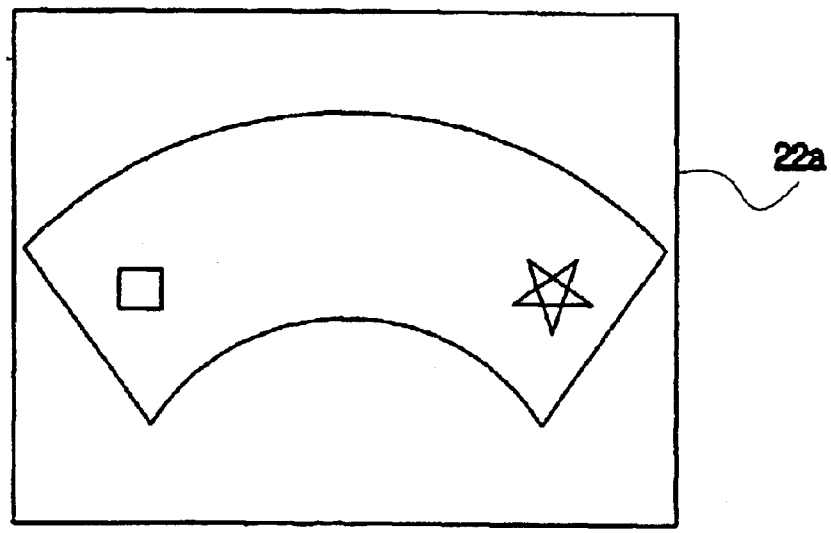
Figure 7:
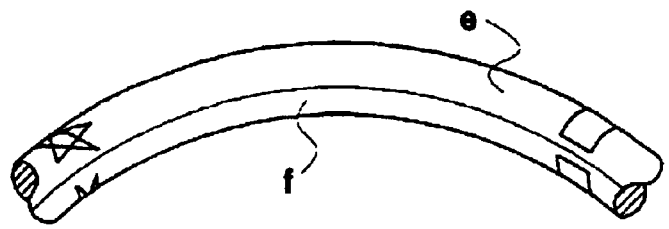
FIG. 7 is a partially cut-away perspective view of a core of a steering wheel rim where liquid pressure transfer printing is performed using the transfer printing sheets of FIGS. 6A and 6B.
Figure 8A:
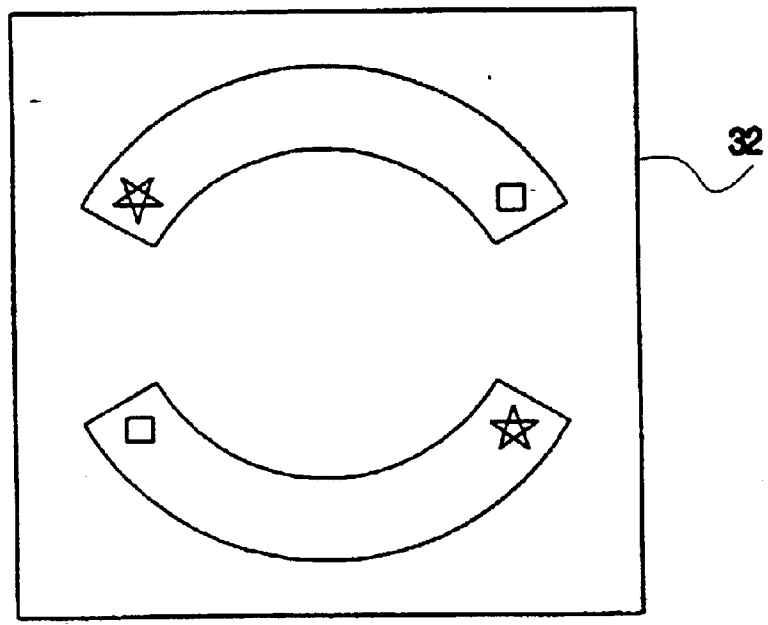
Figure 8B:
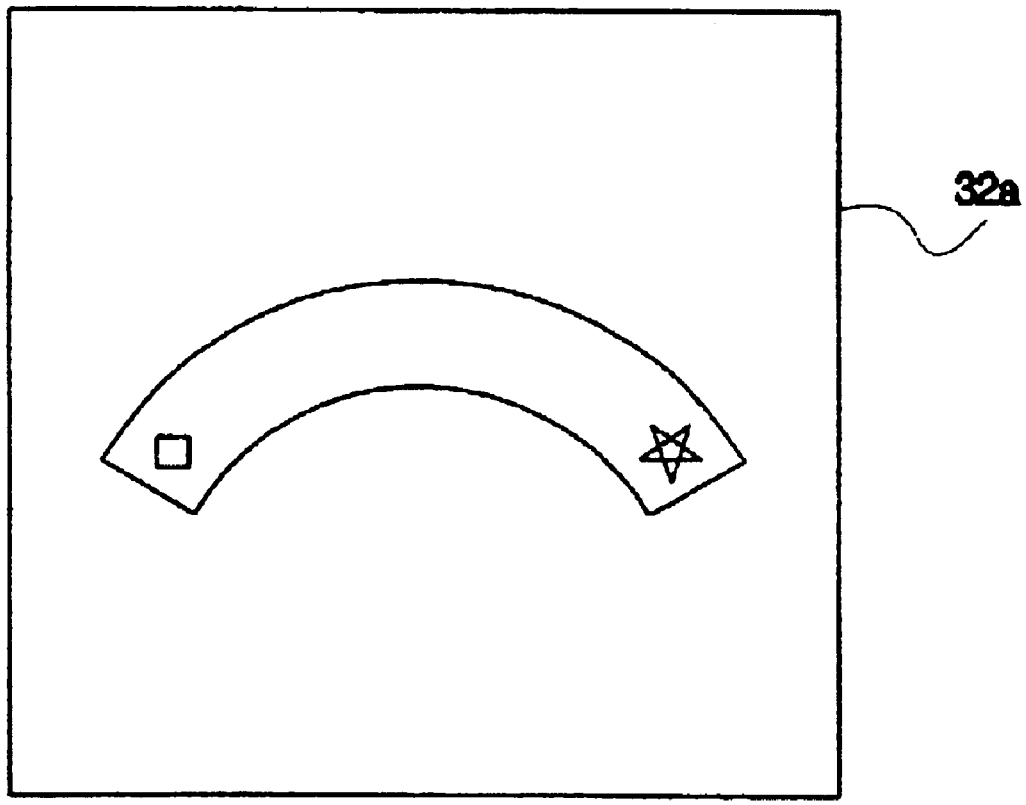

FIG. 7 shows a state in which liquid pressure transfer printing is performed on both sides of a core of a steering wheel rim by using the transfer printing sheets 32 and 32a of FIGS. 8A and 8B, in which the portion a only is taken for the convenience of explanation from the circular steering wheel rim shown in FIG. 1.

FIGS. 8A and 8B show an example of a transfer printing sheet 32 in which a star shape and a rectangular shape are formed at the left and right sides, respectively, and the difference in brightness at the left and right sides is great. In this case, while a portion e shown in FIG. 7 is masked, the other half portion f (the front surface of the steering wheel rim) is first transfer-printed. Then, the star shape and the rectangular shape appear at the left and right sides in FIG. 7, respectively.

That is, since there is no protruding structure causing interference at the front surface of the steering wheel rim, two arc shapes facing each other to be printed on both portions a and b are maintained, and also a point symmetric shape can be designed, as shown in FIG. 8A. When the front surface of the steering wheel rim is dipped in water in a state in which it is kept level with the surface of the water concurrent transfer printing can be performed on the entire surface in one step owing to the shape of the transfer printing sheet 32.

After performing a cleaning step, while the portion f on which transfer printing is performed is masked, by flipping the steering wheel rim over, part of a surface corresponding to the portion e (the rear surface of the steering wheel rim) is secondarily transfer-printed by using the transfer printing sheet 32a of FIG. 8B. As a result, the rectangular shape and star shape appear at the left and right sides in FIG. 7 in which the steering wheel rim is flipped, respectively. Next, the steering wheel rim is rotated by 180° so that transfer printing can be performed on the remaining portion of the steering wheel rim. Then, by dipping the remaining portion into water where another transfer printing sheet 32a shown in FIG. 8B floats, a third transfer printing is performed and all the steps are completed.

Consequently, the transfer printing sheet 32a for the portion e where the pattern is formed opposite to that of the transfer printing sheet 32 for the portion f is prepared and transfer printing is separately performed by using the transfer printing sheets 32 and 32a in the same manner. Accordingly, the star shapes of the transfer printing sheets 32 and 32a are both located at the same side while the rectangular shapes are both located at the opposite side so that a natural and smooth connection of a pattern can be maintained and a product with no difference in brightness at the left and right sides can be obtained. Also, since it is possible to arrange patterns of the first transfer printing sheet 32 corresponding to portions of the steering wheel rim subject to transfer printing during the first step to perform transfer printing on the front surface of the steering wheel rim, transfer printing on the front surface of the steering wheel rim is possible by a single transfer printing step. Thus, the process of transfer printing is simplified as the transfer printing to the front surface of the steering wheel rim is completed in one step, working time can be remarkably reduced, and productivity can be improved.

As described above, when the patterns at the left and right sides of a core of a steering wheel rim on which transfer printing is performed are different in brightness and have directivity, transfer printing is performed first and second times by using transfer printing sheets having complementary patterns. Thus, discontinuity due to mismatch of patterns or extreme difference in brightness can be removed and an aesthetic steering wheel rim can be manufactured.

Also, in the case of an obstruction to transfer printing, by minimizing the repeated transfer printing steps, the cost and time for work is reduced so that productivity can be improved.

What is claimed is:

1. A liquid pressure transfer printing method for a steering wheel rim of a steering wheel of an automobile, using transfer printing sheets, the method comprising:

preparing a transfer printing sheet for a front surface of the steering wheel rim where patterns having a first shape are arranged at all positions corresponding to transfer printing positions on the front surface of the steering wheel rim, so that the patterns can be concurrently transfer-printed at the transfer printing positions on the front surface;

preparing first and second transfer printing sheets for first and second transfer printing portions of a rear surface of the steering wheel rim, respectively, where patterns of a second shape are independently arranged to correspond to positions of the patterns of the first shape, so that transfer printing can be performed on the rear surface of the steering wheel rim without interference by a steering column attachment portion protruding rearwardly from the steering wheel;

masking the rear surface of the steering wheel rim;

performing transfer printing on all transfer printing portions of the front surface of the steering wheel rim using the transfer printing sheet for the front surface while the rear surface of the steering wheel rim is masked;

cleaning and masking the front surface on which the first transfer printing has been performed;

removing the mask from the rear surface of the steering wheel;

performing transfer printing on the first transfer printing portion of the rear surface using the first transfer printing sheet for the rear surface; and after performing transfer printing on the first transfer printing portion, performing transfer printing on the second transfer printing portion of the rear surface using the second transfer printing sheet for the rear surface.

2. The method as claimed in claim 1, wherein the transfer printing sheet for the front surface has a pattern with an arc shape, all positions of which correspond to positions of the steering wheel rim to which transfer printing is to be performed.

3. The method as claimed in claim 2, wherein the pattern on the transfer printing sheet for the front surface is complementary about a center point.

4. The method as claimed in claim 1, wherein the first and second transfer printing sheets for the rear surface have patterns with arc shapes, and the patterns are symmetrical about a point with respect to the pattern on the transfer printing sheet for the front surface.

* * * * *